United States Patent
Koga

(10) Patent No.: US 8,693,861 B2
(45) Date of Patent: Apr. 8, 2014

(54) LENS BARREL

(75) Inventor: Akira Koga, Osaka (JP)

(73) Assignee: Panasonic Corporation, Osaka (JP)

(*) Notice: Subject to any disclaimer, the term of this patent is extended or adjusted under 35 U.S.C. 154(b) by 0 days.

(21) Appl. No.: 13/561,083

(22) Filed: Jul. 30, 2012

(65) Prior Publication Data

US 2013/0100540 A1 Apr. 25, 2013

(30) Foreign Application Priority Data

Oct. 25, 2011 (JP) ................................. 2011-233495
Jun. 6, 2012 (JP) ................................. 2012-128558

(51) Int. Cl.
*G02B 7/10* (2006.01)
*G03B 3/00* (2006.01)

(52) U.S. Cl.
USPC ............................ 396/144; 359/696; 359/700

(58) Field of Classification Search
USPC ................... 359/694–704, 823–824
See application file for complete search history.

(56) References Cited

U.S. PATENT DOCUMENTS

| | | | |
|---|---|---|---|
| 4,456,356 A | 6/1984 | Okabe | |
| 4,917,846 A | 4/1990 | Takase et al. | |
| 5,222,407 A | 6/1993 | Sekiguchi | |
| 5,592,250 A | 1/1997 | Shimizu | |
| 5,701,208 A | 12/1997 | Sato et al. | |
| 6,008,954 A * | 12/1999 | Shintani et al. | 359/704 |
| 6,434,331 B1 | 8/2002 | Araoka et al. | |
| 6,498,624 B1 * | 12/2002 | Ogura et al. | 348/335 |
| 6,580,571 B2 | 6/2003 | Sasaki et al. | |
| 7,099,573 B2 | 8/2006 | Ikemizo | |
| 7,280,287 B2 | 10/2007 | Yamane | |
| 7,680,409 B2 | 3/2010 | Kurosawa | |
| 7,690,851 B2 | 4/2010 | Yamane et al. | |
| 7,758,261 B2 | 7/2010 | Ohkuma | |
| 7,792,422 B2 | 9/2010 | Mori | |
| 7,864,241 B2 * | 1/2011 | Iwasaki | 348/360 |

(Continued)

FOREIGN PATENT DOCUMENTS

| JP | S62-259816 A | 11/1987 |
|---|---|---|
| JP | H05-034563 A | 2/1993 |

(Continued)

OTHER PUBLICATIONS

Non-final Office Action for the related U.S. Appl. No. 13/561,080, issued Sep. 16, 2013.

(Continued)

*Primary Examiner* — Ricky Mack
*Assistant Examiner* — Danielle Manikeu
(74) *Attorney, Agent, or Firm* — Shinjyu Global IP

(57) ABSTRACT

The lens barrel includes a first frame, a second frame, a drive actuator, and a transmission mechanism that transmits the drive force of the drive actuator. The second frame includes a substantially cylindrical main body, a gear portion, and cam grooves that include an inflection point in the range in which the zoom ratio of the optical system is varied. The transmission mechanism includes a first transmission gear portion that engages with a gear, a second transmission gear portion that is provided coaxially with the first transmission gear portion, and a clutch between the first transmission gear portion and the second transmission gear portion. The clutch temporarily disengages the drive force of the drive actuator transmitted to the first transmission gear portion, only with respect to rotation in one direction.

5 Claims, 9 Drawing Sheets

(56) References Cited

U.S. PATENT DOCUMENTS

| | | | |
|---|---|---|---|
| 7,898,745 B2 | 3/2011 | Matsui et al. | |
| 7,929,049 B2 | 4/2011 | Yamane et al. | |
| 8,031,418 B2 | 10/2011 | Shiga | |
| 8,264,556 B2 | 9/2012 | Hasuda | |
| 8,405,922 B2 | 3/2013 | Terahara | |
| 2009/0002847 A1 | 1/2009 | Nakada et al. | |
| 2010/0013939 A1* | 1/2010 | Ohno et al. | 348/208.5 |
| 2010/0060995 A1 | 3/2010 | Yumiki et al. | |
| 2012/0200768 A1 | 8/2012 | Ito | |
| 2013/0044381 A1 | 2/2013 | Ito | |
| 2013/0077949 A1 | 3/2013 | Koga | |
| 2013/0100540 A1 | 4/2013 | Koga | |

FOREIGN PATENT DOCUMENTS

| | | |
|---|---|---|
| JP | H08-110456 A | 4/1996 |
| JP | 2000-304999 A | 11/2000 |
| JP | 2003-057522 A | 2/2003 |
| JP | 2010-038932 A | 2/2010 |

OTHER PUBLICATIONS

Notice of Allowance and Allowability from the related U.S. Appl. No. 13/561,081 issued Dec. 11, 2013.

* cited by examiner

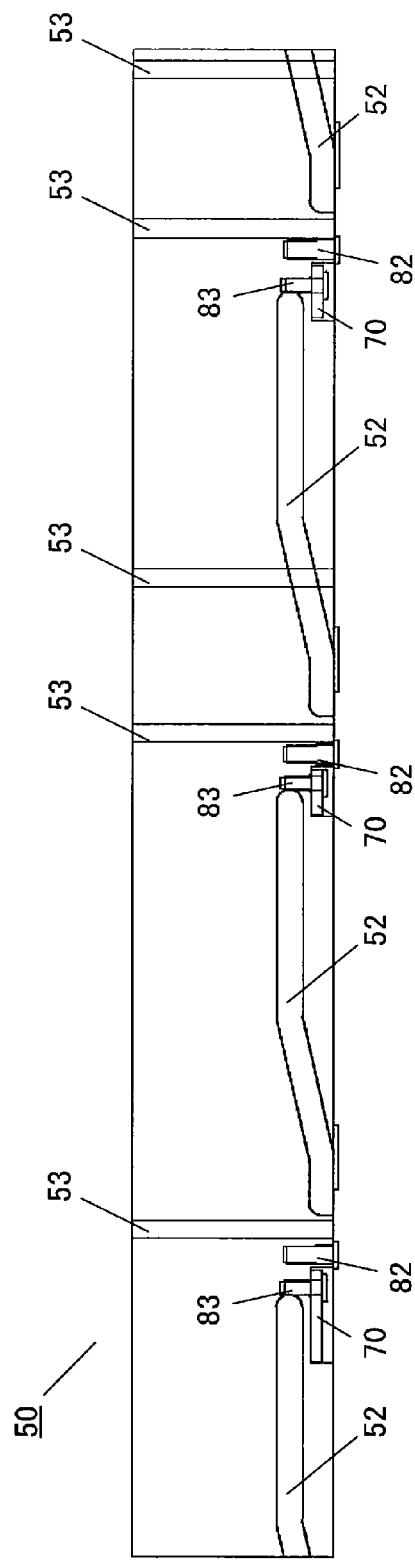
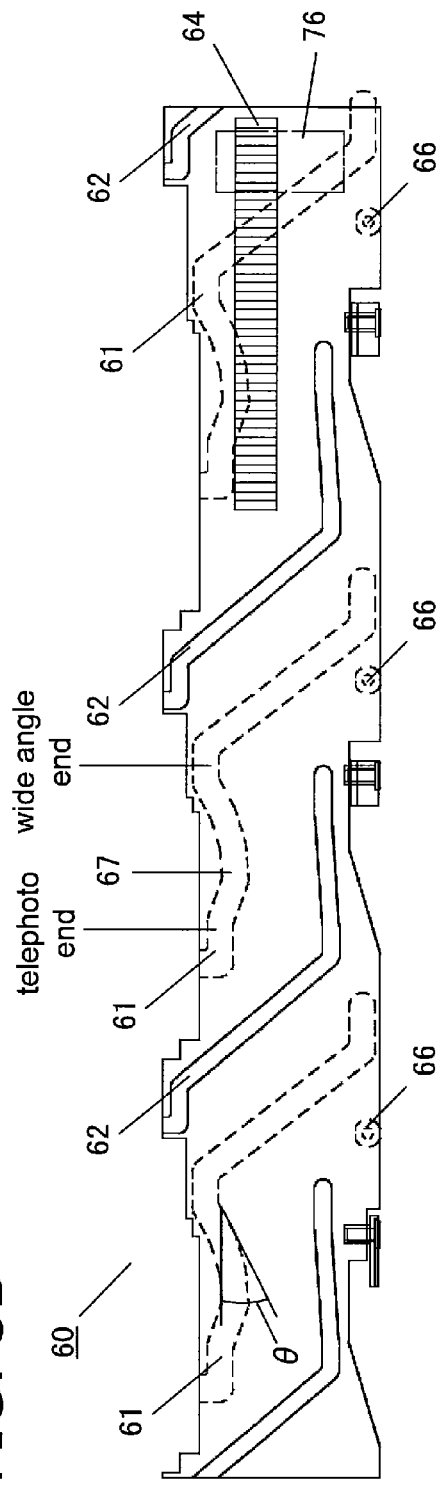
FIG. 3A
FIG. 3B

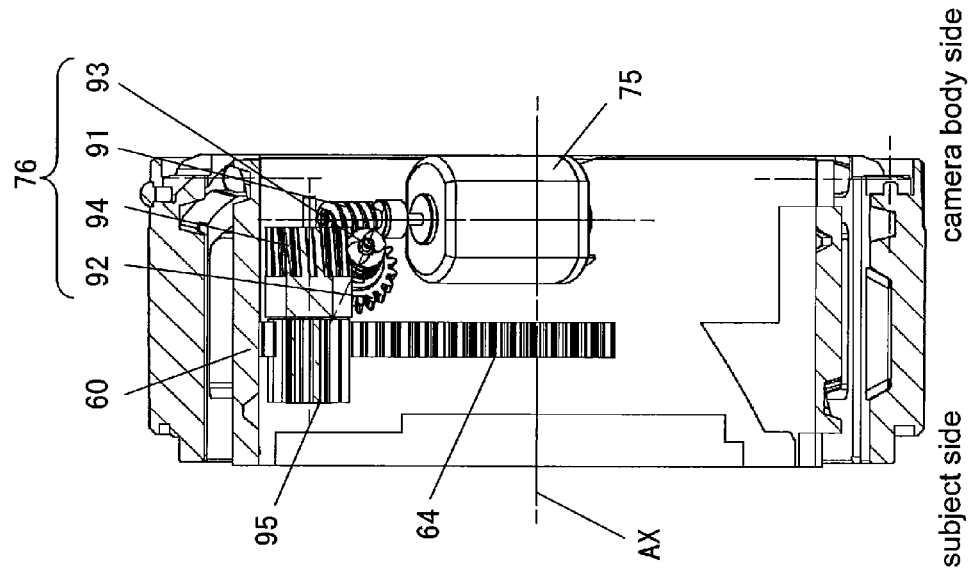
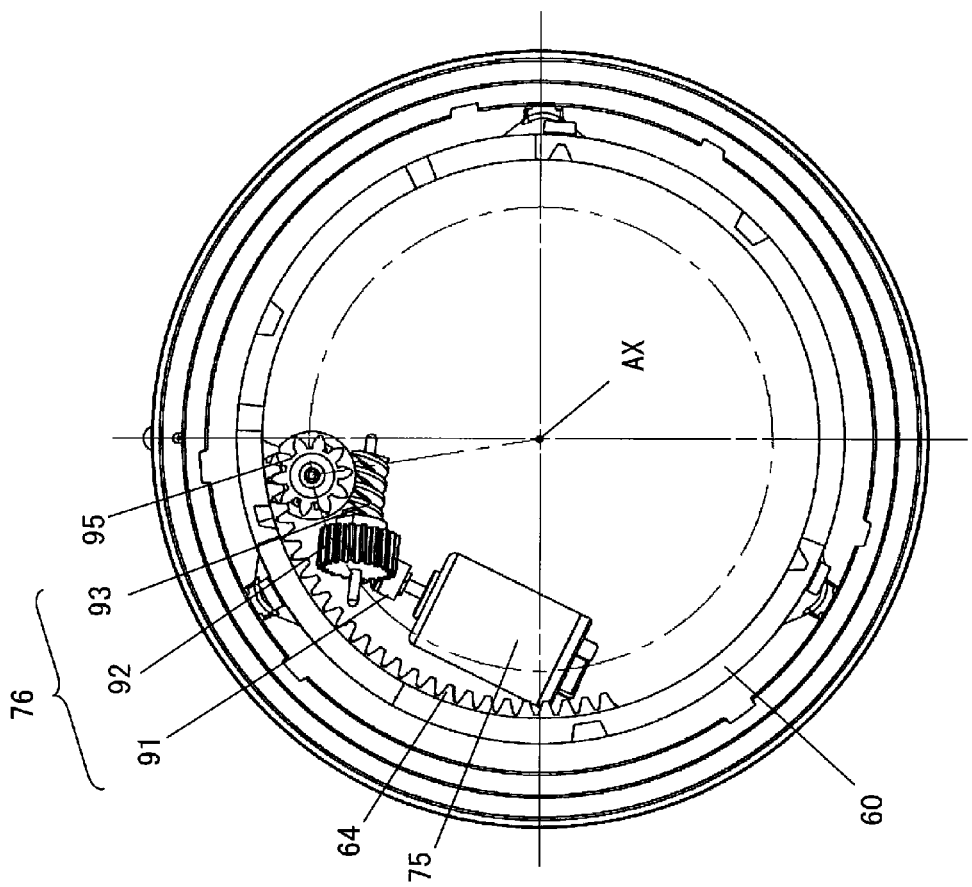
FIG. 4B
FIG. 4A

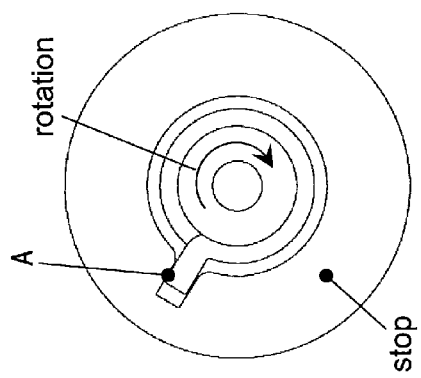
FIG. 6
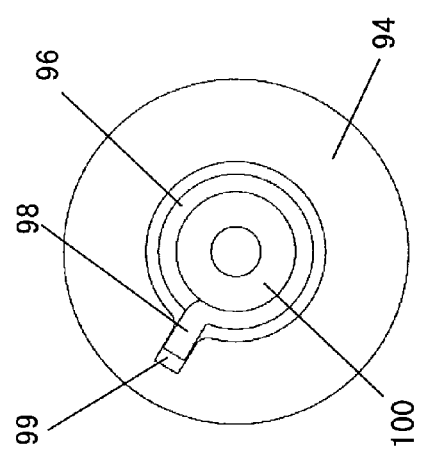
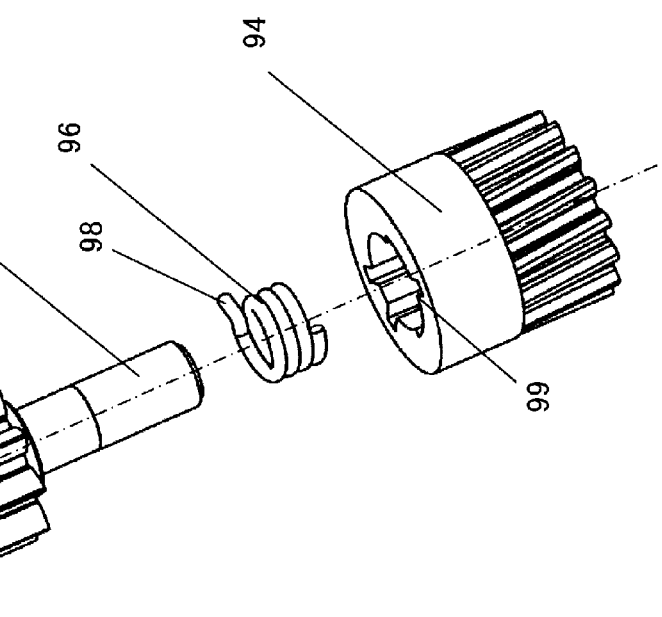
FIG. 5

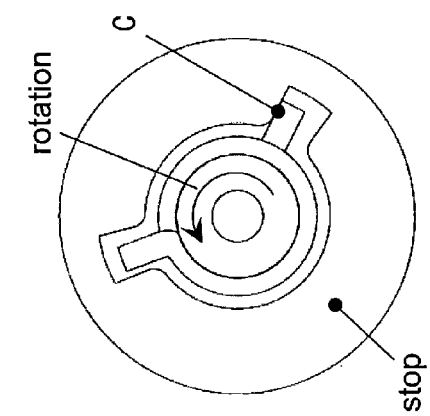
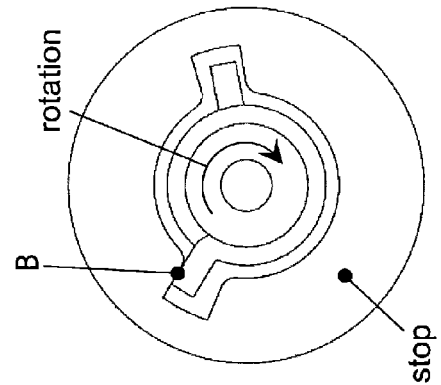

LENS BARREL

CROSS-REFERENCE TO RELATED APPLICATIONS

This application claims priority under 35 U.S.C. §119 to Japanese Patent Application No. 2011-233495, filed on Oct. 25, 2011 and Japanese Patent Application No. 2012-128558, filed on Jun. 6, 2012. The entire disclosure of Japanese Patent Application No. 2011-233495 and Japanese Patent Application No. 2012-128558 are hereby incorporated herein by reference.

BACKGROUND

1. Technical Field

The technology disclosed herein relates to a telescoping lens barrel.

2. Background Information

Imaging devices that produce image data about a subject have rapidly gained popularity in recent years. A lens barrel for adjusting the focal distance is mounted in these imaging devices. Examples of known imaging devices include cameras with an integrated lens and those with an interchangeable lens. A lens barrel is built into an integrated type of camera. A camera with an interchangeable lens has a camera body and a lens barrel that can be mounted to the camera body.

A conventional lens barrel is disclosed in Japanese Laid-Open Patent Application 2010-38932, for example. With this lens barrel, the focal distance can be adjusted, or the overall length can be shortened from the imaging state to the retracted state by moving a lens group along the optical axis direction by rotating a cam barrel via a gear train linked to a motor. A clutch mechanism is installed for one of the gears in the gear train, and is designed so that excessive torque will be interrupted, and gear train damage will be prevented, by the clutch mechanism when the lens barrel is dropped, etc., and an external force is exerted in a direction that would rotate the cam barrel. The clutch mechanism is configured so that it acts only in the direction in which the cam barrel rotates from the imaging state to the retracted state.

SUMMARY

With respect to the lens barrel configuration discussed above, if there is an inflection point in the movement range of a lens group along the optical axis direction, for example, it has been discovered that damage to the gear train will not be sufficiently prevented over the entire range in which the focal distance can be adjusted.

It is an object of the technology disclosed herein to provide a telescoping lens barrel that can be made more compact in its stowed state, and which is more resistant to internal damage by being dropped, etc.

The lens barrel disclosed herein comprises a first frame, a second frame, a drive actuator, and a transmission mechanism. The second frame is configured to be supported rotatably by the first frame and advance and retract with respect to the first frame. The drive actuator is configured to rotationally drive the second frame with respect to the first frame. The transmission mechanism is configured to transmit the drive force of the drive actuator. The second frame includes a substantially cylindrical main body, a gear portion, and cam grooves. The gear portion is disposed on the inner peripheral face of the main body, and rotational drive force is transmitted to it by the transmission mechanism. The cam grooves include an inflection point in the range in which the zoom ratio of the optical system is varied.

The transmission mechanism includes a first transmission gear portion, a second transmission gear portion, and a clutch. The first transmission gear portion is configured to engage with the gear portion. The second transmission gear portion is disposed coaxially with the first transmission gear portion. The clutch is disposed between the first transmission gear portion and the second transmission gear portion. The clutch is configured to temporarily disengage the drive force of the drive actuator transmitted to the first transmission gear portion, only with respect to one-way rotation.

With a lens barrel configured as above, even if the second frame is subjected to excessive torque due to being dropped, etc., the action of the clutch can prevent damage to the transmission mechanism The technology disclosed herein makes it possible to provide a lens barrel that is resistant to damage caused by being dropped or the like.

BRIEF DESCRIPTION OF THE DRAWINGS

Referring now to the attached drawings, which form a part of this original disclosure:

FIG. 3A is an inner peripheral development view of an outer frame 50;

FIG. 3B is an inner peripheral development view of a cam frame 60;

FIG. 4A is a detail view of the interior of the lens barrel 2;

FIG. 4B is a detail view of the interior of the lens barrel 2;

FIG. 5 is a development view of a drive gear 95 and a second worm wheel 94;

FIG. 6 is a diagram of the operation of a unidirectional clutch;

DETAILED DESCRIPTION OF EMBODIMENTS

Selected embodiments of the present technology will now be explained with reference to the drawings. It will be apparent to those skilled in the art from this disclosure that the following descriptions of the embodiments of the present technology are provided for illustration only and not for the purpose of limiting the technology as defined by the appended claims and their equivalents.

First Embodiment

1. External Appearance

Figure 1:
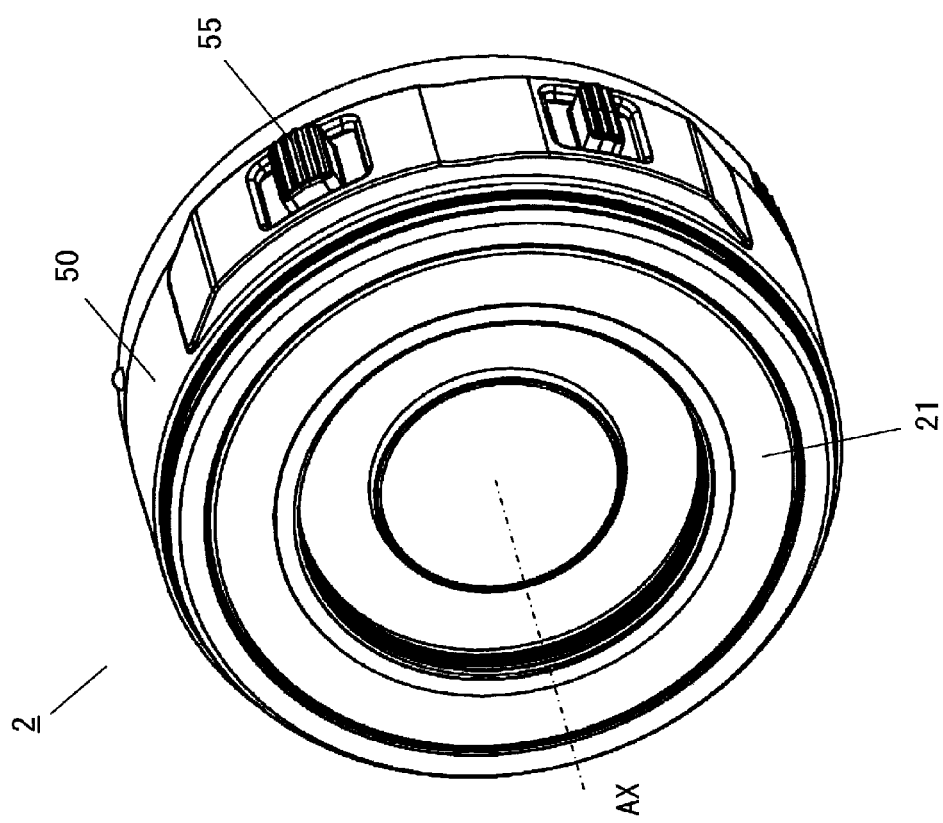
FIG. 1 is an oblique view of a lens barrel 2 (front face side)

FIG. 1 is an oblique view of a lens barrel 2. The lens barrel 2 includes an outer frame 50 around its outermost periphery. The lens barrel 2 also supports a lens with a first lens frame 21. In FIG. 1, an optical axis AX is displayed as the optical axis of the lens. The "optical axis direction" is a direction along the optical axis AX, and is a direction that is parallel to the optical axis AX. A zoom lever 55 is provided to the outer peripheral part of the outer frame 50. The user can adjust the focal distance by operating the zoom lever 55.

2. Vertical Cross Section of Lens Barrel 2

Figure 2:
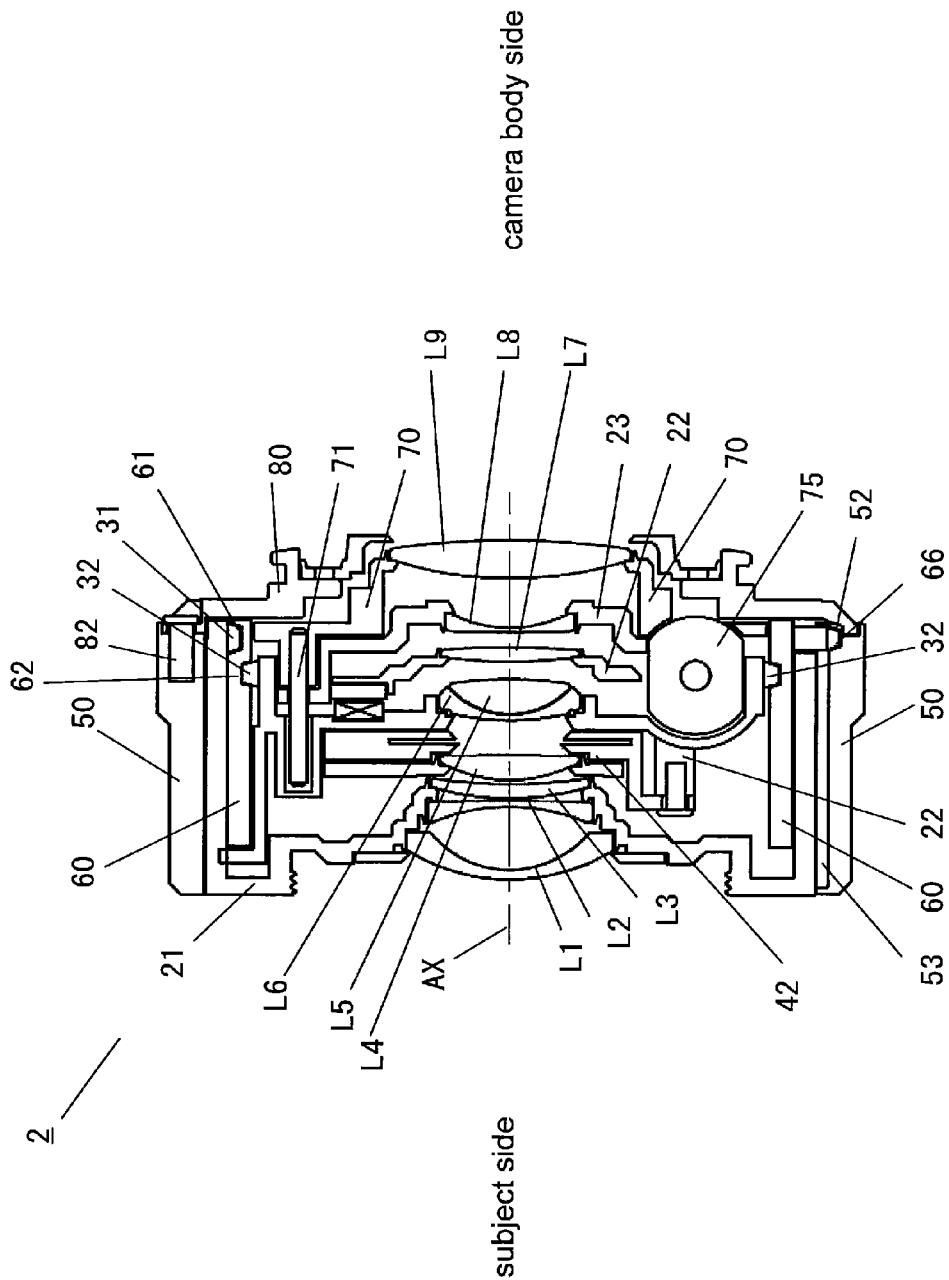
FIG. 2 is a cross section of the lens barrel 2 in its stowed state.

FIG. 2 is a vertical cross section of the lens barrel 2 when the first lens frame 21 has moved all the way to the lens mount 80 side.

The outer frame 50 is fixed to the lens mount 80. The outer frame 50 supports the cam frame 60 rotatably and retractably along the optical axis direction. The outer frame 50 is a substantially cylindrical member. The fixed frame 70 is fixed to the lens mount 80.

The outer frame 50 is fixed by linking portions (such as screws 82) to the lens mount 80. Cam grooves 52 and rectilinear grooves 53 are formed in the inner peripheral face of the outer frame 50.

The cam frame 60 includes cam followers 66 on its outer peripheral face. The cam followers 66 engage with the cam grooves 52 formed in the inner peripheral face of the outer frame 50. Consequently, when the cam frame 60 rotates with respect to the outer frame 50, the cam followers 66 move along the cam grooves 52. As a result, the cam frame 60 advances and retracts with respect to the outer frame 50. First cam grooves 61 are formed in the outer peripheral face of the cam frame 60. Second cam grooves 62 are formed in the inner peripheral face of the cam frame 60.

The cam frame 60 supports the first lens frame 21. First cam followers 31 are formed on the first lens frame 21. The first cam followers 31 engage with the first cam grooves 61. Consequently, when the cam frame 60 rotates with respect to the first lens frame 21, the first cam followers 31 move along the first cam grooves 61. As a result, the first lens frame 21 advances and retracts with respect to the cam frame 60. The first lens frame 21 supports lenses L1, L2, and L3.

The cam frame 60 supports a second lens frame 22. Second cam followers 32 are formed on the second lens frame 22. The second cam followers 32 engage with the second cam grooves 62. Consequently, when the cam frame 60 rotates with respect to the second lens frame 22, the second cam followers 32 move along the second cam grooves 62. As a result, the second lens frame 22 advances and retracts with respect to the cam frame 60. The second lens frame 22 supports lenses L4, L5, L6, and L7. An aperture unit 42 is attached to the second lens frame 22, and moves integrally with the second lens frame 22 along the optical axis direction. The cam frame 60 includes a cylindrical main body.

The fixed frame 70 supports a third lens frame 23 via a shaft 71. The third lens frame 23 is driven along the optical axis direction by a focus motor (not shown). The third lens frame 23 supports a lens L8. The fixed frame 70 supports a lens L9. A stepping motor, for example, is used as the focus motor.

A motor 75 is fixed to the fixed frame 70. The motor 75 is disposed on the inner peripheral side of the cam frame 60. The motor 75 is a drive means for rotating the cam frame 60. The zoom state is changed by rotating the cam frame 60 and adjusting the positions of the first lens frame 21 and the second lens frame 22.

In this embodiment, an example was given in which the optical system was made up of four groups of lenses, but the present technology is not limited to this.

3. Cam Grooves

FIG. 3A is a development view of the inner periphery of the outer frame 50. The rectilinear grooves 53 are used to guide so that the first lens frame 21 does not rotate. Rectilinear protrusions (not shown) formed on the first lens frame 21 engage with the rectilinear grooves 53. The cam grooves 52 are provided at three locations in the inner peripheral face of the outer frame 50. The rectilinear grooves 53 are provided at five locations in the inner peripheral face of the outer frame 50.

Screws 83 pass through the fixed frame 70 and are inserted into the outer frame 50. The screws 83 and the screws 82 are each provided at three places.

The three screws 82 are disposed between the three cam grooves 52 in the peripheral direction, and do not interfere with the cam grooves 52.

FIG. 3B is a development view of the inner periphery of the cam frame 60. The second cam grooves 62 and a gear portion 64 are provided to the inner peripheral face of the cam frame 60. The gear portion 64 meshes with a gear provided to a transmission mechanism 76, and transmits the drive force of the motor 75 to the cam frame 60.

The first cam grooves 61 and the cam followers 66 are provided to the outer peripheral face of the cam frame 60. As shown in FIG. 3B, the first cam grooves 61 include an inflection point 67 between the wide angle end and the telephoto end. In moving from the wide angle end to the telephoto end, the first lens frame 21 moves to the camera body side up to the inflection point 67, and moves to the subject side after passing through the inflection point 67. θ is the pressure angle of the first cam grooves 61, and the pressure angle θ is the angle formed by the first cam grooves 61 and the rotational direction of the cam frame 60.

4. Details of Interior of Lens Barrel 2

FIG. 4 shows detail front and side views of the interior of the lens barrel 2 as seen from the subject side. The motor 75 and the transmission mechanism 76 are provided in the interior of the lens barrel 2. The transmission mechanism 76 is made up of a first worm gear 91, a first worm wheel 92, a second worm gear 93, and a second worm wheel 94. The first worm gear 91 is attached to the output shaft of the motor 75 and rotates integrally with the output shaft. The first worm gear 91 meshes with the first worm wheel 92. The first worm wheel 92 includes a rotational axis that coincides with that of the second worm gear 93, and rotates integrally. The second worm gear 93 meshes with the second worm wheel 94. The second worm wheel 94 includes a rotational axis that coincides with that of a drive gear 95, and rotates integrally. The drive gear 95 meshes with the gear portion 64, and the rotational drive force of the motor 75 is transmitted through the transmission mechanism 76 to the cam frame 60.

FIG. 5 is a development view of the drive gear 95 and the second worm wheel 94. A gear portion 100 is integrally formed on the lower side of the drive gear 95. The inside diameter of a coil spring 96 is smaller than the outside diameter of the gear portion 100, the coil spring 96 is attached while being tightened with a specific force to the gear portion 100, and the coil spring 96 and the drive gear 95 rotate integrally. A bent part 98 is formed at one end of the coil spring 96. A groove 99 is formed on the inner peripheral side of the second worm wheel 94, and the bent part 98 is inserted therein. The bent part 98 inserted into the groove 99 allows the second worm wheel 94 to rotate integrally with the drive gear 95.

FIG. 6 is a diagram of the operation of a unidirectional clutch. The bent part 98 of the coil spring 96 mated with the gear portion 100 is inserted into the groove 99 of the second worm wheel 94. When the drive gear 95 rotates clockwise as shown in FIG. 6 in a state in which the second worm wheel 94 is stopped, a force pressing the bent part 98 in the opposite direction from the rotational direction is generated at point A. The force pressing on the bent part 98 expands the inside diameter of the coil spring 96, allowing the gear portion 100 to slide in the rotational direction with respect to the coil spring 96, and the transmission of rotational force to the second worm wheel 94 is disengaged.

Figure 7:
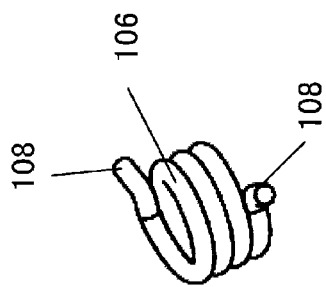
FIG. 7 is an oblique view of a coil spring 106 for a bidirectional clutch.

FIG. 7 is an oblique view of a coil spring for a bidirectional clutch. Bent parts 108 are formed at the ends of the coil spring 106.

Figure 8:
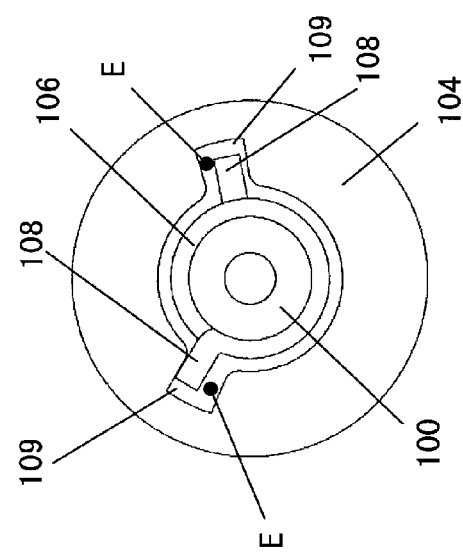
FIG. 8 is a diagram of the operation of a bidirectional clutch.

FIG. 8 is a diagram of the operation of a bidirectional clutch. Grooves 109 are formed at two places in a second worm wheel 104, and the bent parts 108 of the coil spring 106 are inserted therein. When the gear portion 100 that is integral with the drive gear 95 rotates clockwise in a state in which the second worm wheel 104 is stopped, a force pressing the bent parts 108 in the opposite direction from the rotational direction is generated at point B. The force pressing on the bent parts 108 expands the inside diameter of the coil spring 106, allowing the gear portion 100 to slide in the rotational direction with respect to the coil spring 106, and the transmission of rotational force to the second worm wheel 104 is disengaged.

When the gear portion 100 that is integral with the drive gear 95 rotates counter-clockwise in a state in which the second worm wheel 104 is stopped, a force pressing the bent parts 108 in the opposite direction from the rotational direction is generated at point C, and the transmission of rotational force to the second worm wheel 104 is disengaged. With a bidirectional clutch, a gap E must be provided to the bent parts 108 and the grooves 109 to loosen the coil spring 106 when the rotational direction reverses. The gap E creates backlash of about 10 to 20 degrees between the drive gear and the second worm wheel 104, so zoom operation response of the bidirectional clutch and so forth may be worse than that of a unidirectional clutch.

Figure 9:
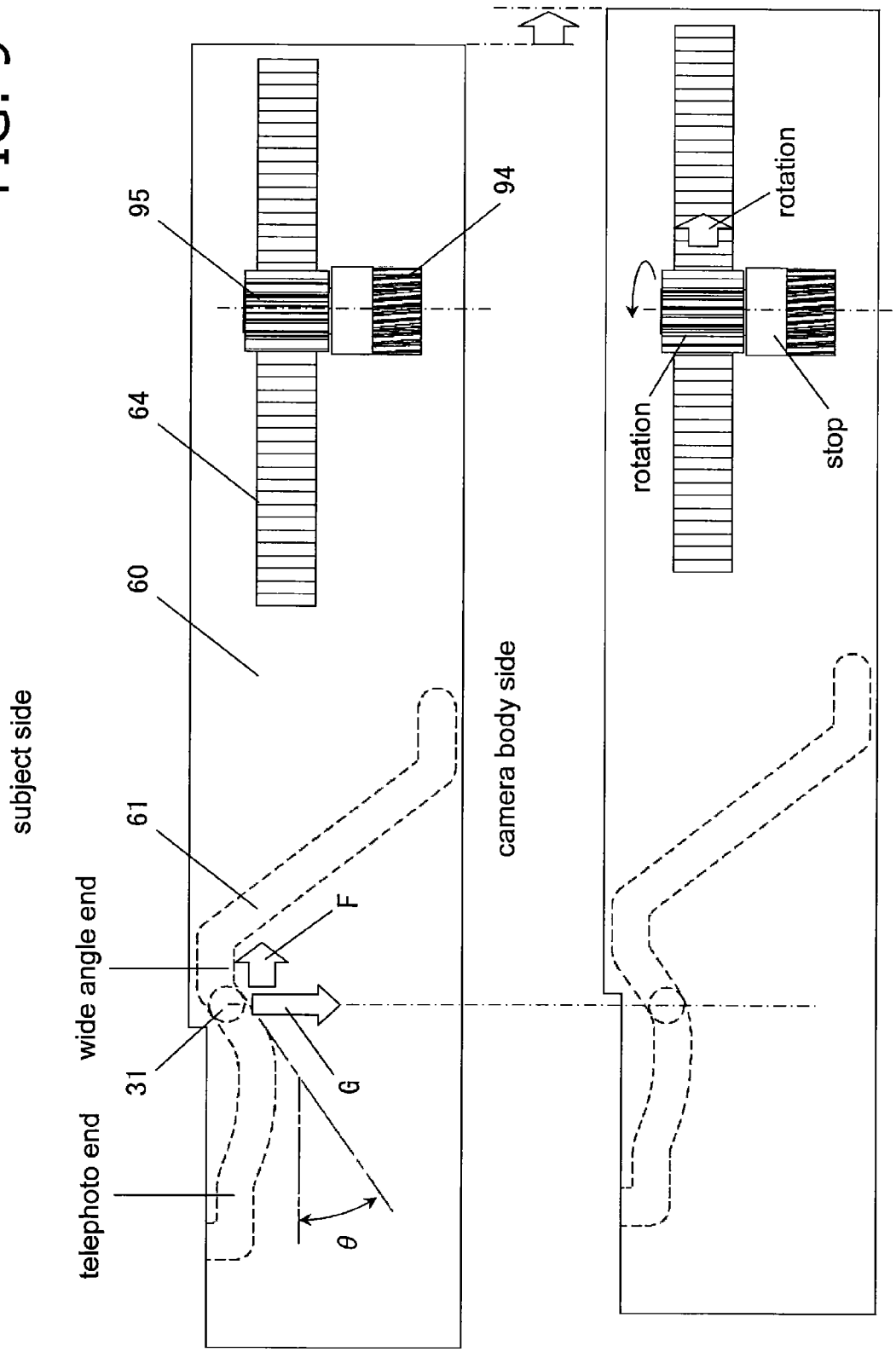
FIG. 9 shows the operation of the cam frame 60 under an external force.

FIG. 9 shows the operation of the cam frame 60 when the lens barrel 2 is subjected to an external force. If a force G that moves the first lens frame 21 to the camera body side along the optical axis direction is generated at the first cam followers 31 when the lens barrel 2 is in its imaging state near the wide angle end, the first cam followers 31 press on the inclined faces of the first cam grooves 61, and a force F is generated in the direction of rotating the cam frame 60. The rotation of the cam frame 60 by the force F is transmitted through the gear portion 64 to the drive gear 95 and the second worm wheel 94. However, since the second worm gear 93 does not reverse, the second worm wheel 94 does not rotate and is locked. Since the transmission of torque is disengaged by the coil spring 96 at this point, the drive gear 95 rotates in a state in which the second worm wheel 94 is locked.

The torque that can be transmitted from the drive gear 95 to the second worm wheel 94 is set to a value that will not damage the gears of the transmission mechanism 76. The torque transmission upper limit value is adjusted according to the material, gauge, inside diameter, and so forth of the coil spring 96.

FIG. 9 illustrates a case in which the imaging state is near the wide angle end, but when the imaging state is instead near the telephoto end, if a force G that moves the first lens frame 21 to the camera body side along the optical axis direction is generated at the first cam followers 31, a force in the opposite direction from that of the force F is generated at the cam frame 60, and the cam frame 60 reverses. In this case, damage to the gears of the transmission mechanism 76 can be prevented by employing the bidirectional clutch configuration illustrated in FIG. 8.

If the pressure angle θ of the first cam grooves 61 is reduced here, the force F that rotates the cam frame 60 is smaller. The selection of this configuration is an effective way to prevent gear damage. To reduce the pressure angle θ, the amount of rotation of the cam frame 60 has to be increased. However, if an attempt is made to increase the amount of rotation of the cam frame 60, the developed lengths of the first cam grooves 61, the second cam grooves 62, and the gear portion 64 increase (see FIG. 3B). This makes it harder to dispose the first cam grooves 61, the second cam grooves 62, and the gear portion 64 around the outer periphery of the cam frame 60. Therefore, the outside diameter of the cam frame 60 has to be increased. In other words, the lens barrel ends up being larger.

Figure 10:
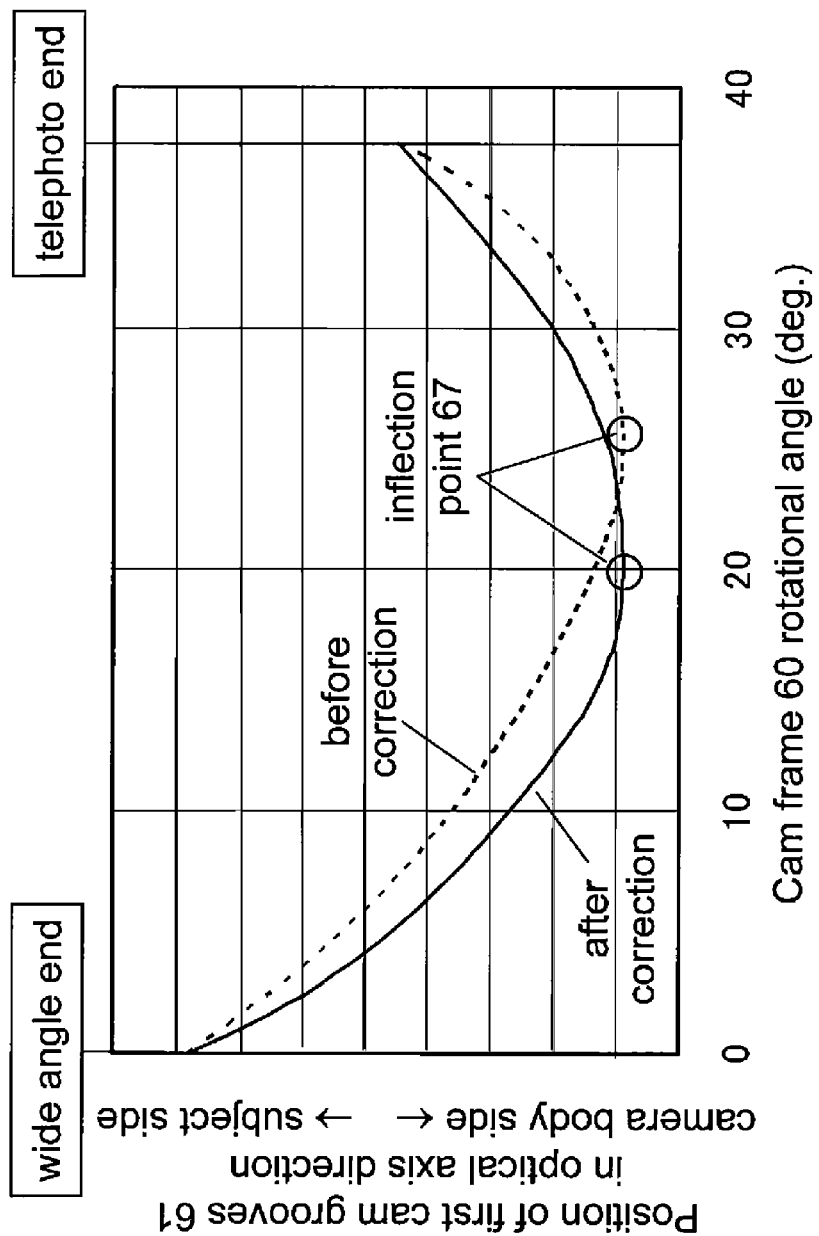
FIG. 10 shows the relation between first cam grooves 61 and the rotational angle of the cam frame 60.

To solve this problem, in this embodiment the following technique is employed. FIG. 10 shows the relation between the first cam grooves 61 and the rotational angle of the cam frame 60. The conventional shape of the first cam grooves 61 is such that the inflection point 67 is close to a rotational angle of 26 degrees (see the broken line in FIG. 10). In contrast, in this embodiment the shape of the first cam grooves 61 is corrected to move the inflection point 67 closer to 20 degrees (see the solid line in FIG. 10). This is accomplished by altering the amount of change in the first cam grooves 61 (the position change amount) with respect to the rotational angle of the cam frame 60 before and after the inflection point 67.

Figure 11:
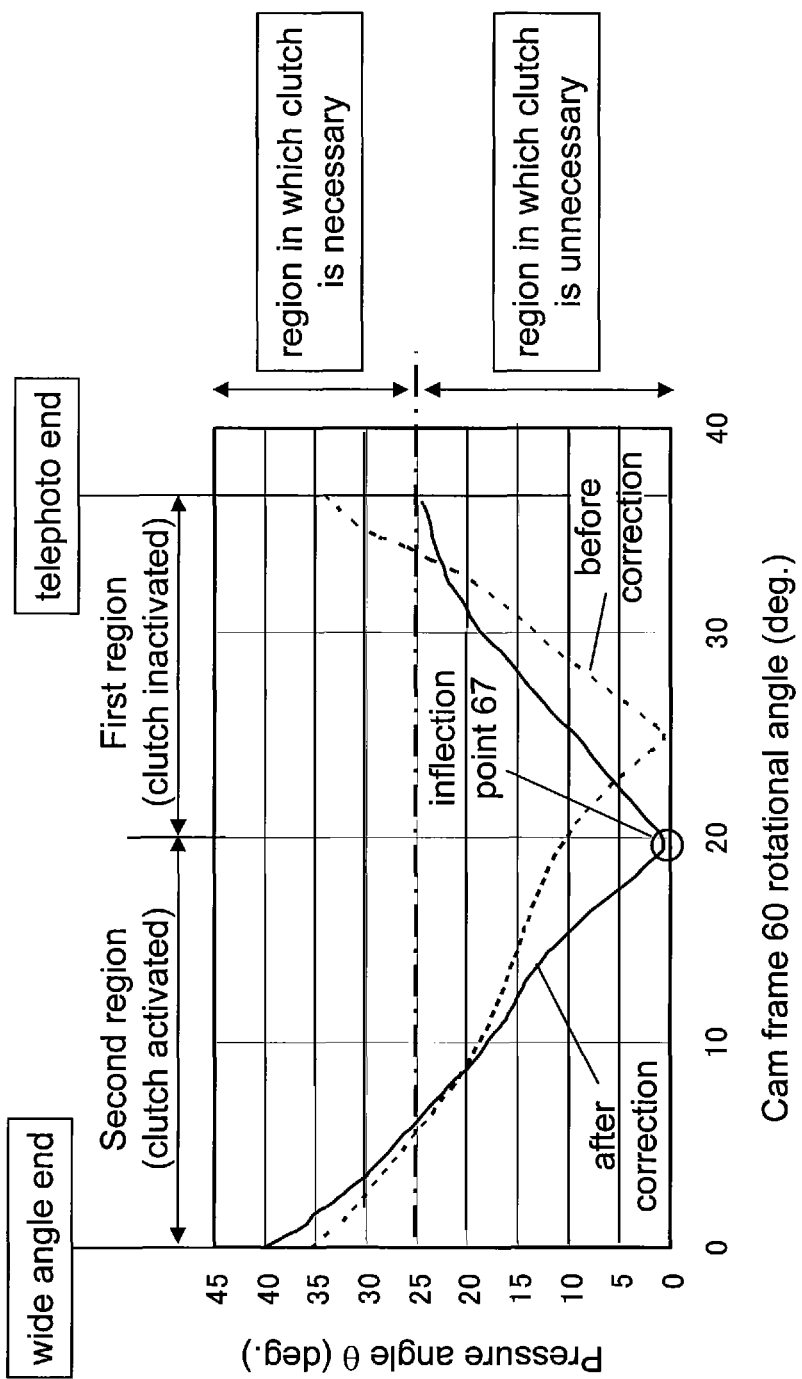
FIG. 11 shows the relation between a first cam groove pressure angle θ and the rotational angle of the cam frame 60.

FIG. 11 shows the relation between the rotational angle of the cam frame 60 and the first cam groove pressure angle θ. In this embodiment, the shape of the first cam grooves 61 is corrected so that the inflection point 67 is close to the rotational angle of 20 degrees of the cam frame 60 (see FIG. 10). Also, the uncorrected pressure angle θ is 35 degrees at the wide angle end and the telephoto end. Meanwhile, in a region from the wide angle end up to the inflection point 67 (the second region in FIG. 11), the maximum value for the corrected pressure angle θ is 40 degrees. In a region from the telephoto end up to the inflection point 67 (the first region in FIG. 11), the maximum value for the corrected pressure angle θ is 25 degrees. That is, the absolute value for the difference between the maximum value in the first region and the maximum value in the second region is 15 degrees. The situation after correction will be described below.

In a region in which the pressure angle θ is 25 degrees or less, even if a force G that moves the first lens frame 21 to the camera body side along the optical axis direction is generated at the first cam followers 31, the force F that rotates the cam frame 60 still is small. Accordingly, the gear strength of the transmission mechanism 76 can resist the force F. Also, since the force F is small, damage to the gears of the transmission mechanism 76 can also be prevented. Specifically, in this region there is no need for a clutch (such as a bidirectional clutch).

On the other hand, a clutch is necessary in a region in which the pressure angle θ is greater than 25 degrees. In other words, the region in which a clutch is necessary is the region from the wide angle end at which the pressure angle θ is at the maximum 40 degrees, to the inflection point 67. In this region, damage to the gears of the transmission mechanism 76 can be prevented by employing the above-mentioned unidirectional clutch, for example.

As discussed above, if the shape of the first cam grooves 61 is corrected, the pressure angle θ of the first cam grooves 61 near the wide angle end can be increased, and the pressure angle θ of the first cam grooves 61 near the telephoto end can be reduced, merely by changing the position of the inflection point 67, without having to alter the rotational angle of the cam frame 60 from the wide angle end to the telephoto end.

5. Conclusion (1) The lens barrel 2 in this embodiment comprises the outer frame 50, the cam frame 60, the motor 75, and the transmission mechanism 76. The gear portion 64, to which the rotational force of the motor 75 is transmitted, is on the inner peripheral side of the cam frame 60, and the first cam grooves 61 for altering the optical zoom ratio is provided on the outer peripheral side of the cam frame 60. The transmission mechanism 76 includes the drive gear 95 that mesh with the gear portion 64, and the second worm wheel 94 that is provided coaxially with the drive gear 95, and the coil spring 96, which can temporarily disengage transmission torque, is provided between the drive gear 95 and the second worm wheel 94. Rotational force transmitted to the drive gear 95 is temporarily disengaged in only one direction. The first cam grooves 61 include the inflection point 67 in the region where imaging is possible.

Consequently, even if a force G that moves the first lens frame 21 to the camera body side along the optical axis direction is generated at the first cam followers 31 when the lens barrel 2 is in its imaging state, the transmission of torque will be interrupted between the drive gear 95 and the second worm wheel 94, and damage to the transmission mechanism 76 can be prevented.

(2) With the lens barrel 2 in this embodiment, the first cam grooves 61 include a first region from the telephoto end to the inflection point 67, and a second frame from the wide angle end to the inflection point 67. In the second region, the direction in which the cam frame 60 rotates from the wide angle end toward the inflection point 67 is made the same as the direction in which the coil spring 96 disengages the rotational force, and this prevents damage to the gears of the transmission mechanism 76 in the second region. In the first region, since the pressure angle is smaller than in the second region, the force with which an external impact caused by dropping rotates the cam frame 60 is smaller, and this prevents damage to the gears of the transmission mechanism 76.

(3) With the lens barrel 2 in this embodiment, the maximum pressure angle of the first cam grooves 61 in the second region from the wide angle end to the inflection point 67 is greater than the maximum pressure angle of the first cam grooves 61 in the first region from the telephoto end to the inflection point 67. Accordingly, damage to the transmission mechanism 76 can be effectively prevented with just a unidirectional clutch.

(4) With the lens barrel 2 in this embodiment, the absolute value for the difference between the maximum pressure angle of the first cam grooves 61 in the first region from the telephoto end to the inflection point 67 and the maximum pressure angle of the first cam grooves 61 in the second region from the wide angle end to the inflection point 67 is at least 10 degrees, so damage to the transmission mechanism 76 can be effectively prevented.

Other Embodiments

The present technology is not limited to or by the embodiment given above, and various modifications and alterations are possible without departing from the gist of the technology.

Those portions having substantially the same function as the portions in the first embodiment discussed above will be numbered the same and will not be described again in detail.

(1) In the above embodiment, the lens barrel 2 was described as an example, but the lens barrel is not limited to being the lens barrel 2. For example, the lens barrel may be one used in an integrated type of imaging device, rather than an interchangeable lens barrel.

(2) In the above embodiment, the motor 75 was described as an example, but the motor 75 is not limited to being a DC motor, and may instead be another type of motor (such as a stepping motor).

(3) In the above embodiment, the transmission mechanism 76 was constituted by a worm gear and a worm wheel, but may instead be constituted by a spur gear.

(4) In the above embodiment, the first cam grooves 61 were corrected so as to increase the pressure angle on the wide angle end side, but may instead be corrected so as to increase the pressure angle on the telephoto end side. In this case, the configuration may be set up so that a unidirectional clutch is activated in the region from the telephoto end to the inflection point 67.

General Interpretation of Terms

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of the lens barrel. Accordingly, these terms, as utilized to describe the present technology should be interpreted relative to the lens barrel.

The term "configured" as used herein to describe a component, section, or part of a device includes hardware and/or software that is constructed and/or programmed to carry out the desired function The terms of degree such as "substantially", "about" and "approximately" as used herein mean a reasonable amount of deviation of the modified term such that the end result is not significantly changed.

While only selected embodiments have been chosen to illustrate the present technology, it will be apparent to those skilled in the art from this disclosure that various changes and modifications can be made herein without departing from the scope of the technology as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further technologies by the applicant, including the structural and/or functional concepts embodied by such feature(s). Thus, the foregoing descriptions of the embodiments according to the present technology are provided for illustration only, and not for the purpose of limiting the technology as defined by the appended claims and their equivalents.

INDUSTRIAL APPLICABILITY

The lens barrel described above allows damage caused by dropping impact or the like to be prevented, and is therefore useful in the field of imaging devices.

What is claimed is:

1. A lens barrel that supports a lens, comprising:
a first frame;
a second frame configured to be supported rotatably by the first frame and move with respect to the first frame;
a drive actuator configured to rotationally drive the second frame with respect to the first frame; and
a transmission mechanism configured to transmit the drive force of the drive actuator, wherein
the second frame includes:
   a substantially cylindrical main body;
   a gear portion disposed on the inner peripheral face of the main body and to which the rotational drive force is transmitted by the transmission mechanism; and
   cam grooves including an inflection point in the range in which the zoom ratio of the optical system is varied,
the transmission mechanism includes:
   a first transmission gear portion configured to engage with the gear portion;
   a second transmission gear portion disposed coaxially with the first transmission gear portion; and
   a clutch disposed between the first transmission gear portion and the second transmission gear portion, and
   the clutch is configured to temporarily disengage the drive force of the drive actuator transmitted to the first transmission gear portion, only with respect to one-way rotation.

2. The lens barrel according to claim 1, wherein
the cam grooves include:
   a first region encompassing from a first end to the inflection point; and
   a second region encompassing from a second end to the inflection point,
   the maximum value for the pressure angle formed by the cam grooves with respect to the direction in which the second frame rotates is included in the second region, and
   in the second region, the direction in which the second frame rotates from the second end toward the inflection point is the same as the direction in which the clutch disengages the drive force of the drive actuator.

3. The lens barrel according to claim 2, wherein
the maximum value for the pressure angle in the second region is greater than the maximum value for the pressure angle in the first region.

4. The lens barrel according to claim 2, wherein
the absolute value of a difference, between the maximum value for the pressure angle of the cam grooves in the first region and the maximum value for the pressure angle of the cam grooves in the second region, is 10 deg or more.

5. The lens barrel according to claim 2, wherein
the second frame moves forward and retracts, with respect to the first frame, when zooming between the first end and the second end.

* * * * *